US006959889B2

(12) United States Patent
Hiraguchi

(10) Patent No.: US 6,959,889 B2
(45) Date of Patent: Nov. 1, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/667,365

(22) Filed: Sep. 23, 2003

(65) Prior Publication Data

US 2004/0061017 A1 Apr. 1, 2004

(30) Foreign Application Priority Data

Sep. 30, 2002 (JP) ............................ 2002-285972

(51) Int. Cl.[7] ............................................ G11B 23/107
(52) U.S. Cl. ...................................... 242/348; 360/132
(58) Field of Search ............................ 242/348, 348.2; 360/132

(56) References Cited

U.S. PATENT DOCUMENTS 6,435,439 B1 8/2002 Ishihara et al.
2004/0041053 A1 * 3/2004 Iino ........................ 242/348.2
2004/0061016 A1 * 4/2004 Morita et al. ............... 242/348
2004/0089757 A1 * 5/2004 Ishihara ................... 242/348.2

FOREIGN PATENT DOCUMENTS

JP 2000-076821 A 3/2000
JP 2001-148179 A 5/2001

* cited by examiner

*Primary Examiner*—John Q. Nguyen
(74) *Attorney, Agent, or Firm*—Sughrue Mion, PLLC

(57) ABSTRACT

A recording tape cartridge has a rectangular case which rotatably accommodates a single reel on which a recording tape is wound, an opening which is formed in the case and is for pulling-out of a leader member attached to an end portion of the recording tape, a shielding member for opening and closing the opening by sliding, and an urging member for urging the shielding member in a direction of closing the opening. A supporting portion, which supports the urging member in a cantilevered state, is formed at a portion for attachment of the urging member, which portion for attachment is provided at the shielding member.

12 Claims, 8 Drawing Sheets

RECORDING TAPE CARTRIDGE

CROSS-REFERENCE TO RELATED APPLICATION

This application claims priority under 35 USC 119 from Japanese Patent Application No. 2002-285972, the disclosure of which is incorporated by reference herein.

BACKGROUND OF THE INVENTION

1. Field of the Invention

The present invention relates to a recording tape cartridge. The recording tape cartridge accommodates a single reel around which a recording tape, such as a magnetic tape, primarily used as a recording/playback medium for a computer or the like.

2. Description of the Related Art

A conventional magnetic tape cartridge is known, being constructed such that a magnetic tape used as a data recording/playback medium for a computer or the like is wound on a single reel, and the reel is accommodated in an accommodating case. A leader member, such as a leader pin, a leader tape, or a leader block, is provided to the end of the magnetic tape. The leader member is pulled out from an opening of the magnetic tape cartridge by using pull-out means provided in a drive device, and the magnetic tape fixed to the leader member is wound around a take-up reel in the drive device.

A reel gear is formed annularly in the center of the reel lower surface appearing from an opening formed on a lower surface of the magnetic tape cartridge, a drive gear provided on a rotation shaft in the drive device is engaged with the reel gear, and the reel is thereby rotationally driven. Therefore, data can be recorded on the magnetic tape, or data recorded on the magnetic tape can be played back in such a manner that the reel of the magnetic tape cartridge and the take-up reel of the drive device are rotated in synchronization.

Magnetic tape cartridges of the above-described type are characterized in that the accommodating space for preservation can be small, and a large amount of information can be recorded. As shown in FIG. 8, when a leader pin 70 is provided at an end of a magnetic tape T, which is wound around a reel 72, an opening 68 is formed on a sidewall 64 of an accommodating case 62 formed parallel to the direction of insertion to the drive device (direction of an arrow P). In this case, a door 66 slidably moves in the same direction as the direction of insertion to thereby open and close the opening 68.

This type of door 66 is assembled in the case 62 by a coil spring 67 being placed on a shaft 65 which projects at the rear end portion of the door 66, and the rear end portion of the coil spring 67 being anchored on an anchor portion 69 provided at the case 62. In this way, the door 66 is always urged in the direction of closing the opening 68. Due to the door 66 sliding in the direction opposite to the direction of arrow P as the magnetic tape cartridge is loaded into a drive device, the door 66 opens the opening 68 as shown in Japanese Patent Application Laid-Open (JP-A) No. 2001-148179 and Japanese Patent Application Laid-Open (JP-A) No. 2000-76821, the disclosures of which are incorporated by reference herein.

When the door 66 is assembled into the case 62, the door 66 must be assembled while anchoring the rear end portion of the coil spring 67 on the anchor portion 69 and pressing the rear end portion so that it does not come off of the anchor portion 69. Thus, this assembly operation tends to become troublesome, and the assemblability is not always good.

SUMMARY OF THE INVENTION

In view of the aforementioned, an object of the present invention is to provide a recording tape cartridge in which the ability to assemble a door (a shielding member) and a coil spring (an urging member) into a case is improved.

In order to achieve the above-described object, a recording tape cartridge relating to the present invention comprises: a case which is substantially rectangular and which rotatably accommodates a single reel on which a recording tape is wound; an opening which is formed in the case and is for pulling-out of a leader member attached to an end portion of the recording tape; a shielding member opening and closing the opening by sliding; and an urging member urging the shielding member in a direction of closing the opening. A supporting portion, which supports the urging member in a cantilevered state, is formed at a portion for attachment of the urging member. The portion for attachment is provided at the shielding member.

In accordance therewith, the urging member, one end of which is attached to the portion for attachment provided at the shielding member, is supported in a cantilevered state by the supporting means. Accordingly, in this state, when the shielding member is assembled into the case, the urging member is supported without drooping down. Thus, the other end of the urging member can easily be attached to a portion for attachment which is provided at an appropriate place within the case. Accordingly, assembly into the case is easy, and the ability to assemble the shielding member and the urging member into the case can be improved.

DETAILED DESCRIPTION OF THE INVENTION

Figure 1:
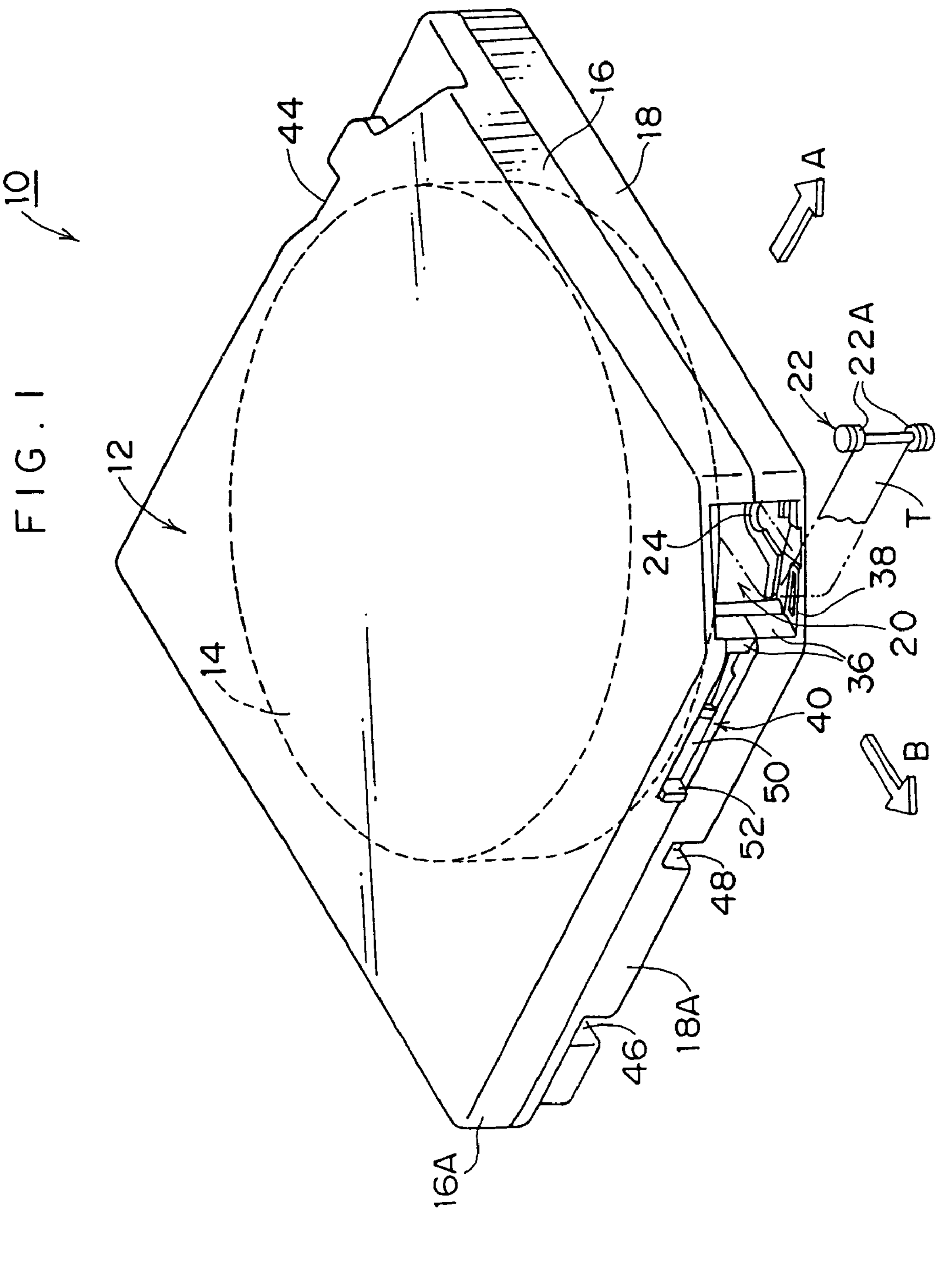
FIG. 1 is a schematic perspective view of a recording tape cartridge.

Now, a recording tape cartridge 10 according to an embodiment of the present invention will be described with reference to FIGS. 1 through 7. First, the overall construction of the recording tape cartridge 10 will briefly be described. Then, essential portions relative to the invention will be described. In the drawings, for the sake of description, the direction of insertion of the recording tape cartridge 10 into a drive device is shown by an arrow A. The insertion direction is nominally the front direction (foreside) of the recording tape cartridge 10. The direction shown by an arrow B perpendicular to the arrow A is nominally the right direction of the recording tape cartridge 10.

Figure 2:
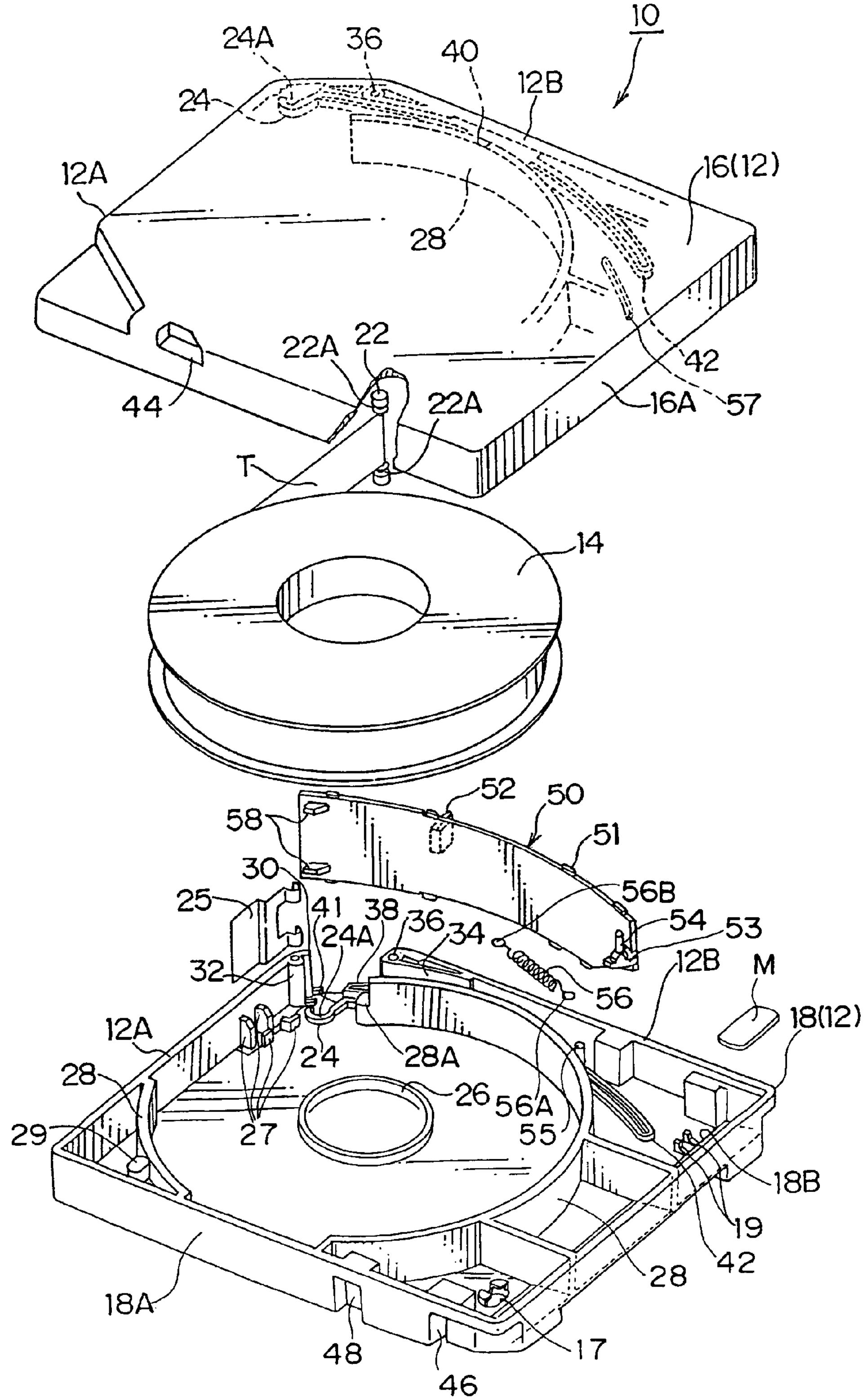
FIG. 2 is a schematic exploded perspective view of the recording tape cartridge.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view. The case 12 is formed by peripheral walls 16A and 18A of an upper case 16 and a lower case 18 being set to oppose one another and being joined together. At each of the peripheral walls 16A, 18A, the front right corner portion, which is one corner portion at the leading side in the direction of loading the recording tape cartridge 10 into a drive device, is cut obliquely as seen in plan view. A space for accommodating the reel 14, on which the magnetic tape T is wound, is formed at the interior of the case 12.

The cut corner portions of the peripheral walls 16A, 18A form an opening 20 for the pulling-out of the magnetic tape T. A leader pin 22, which is pulled-out by a pull-out means of a drive device, is connected to the free end of the magnetic tape T which is pulled out from the opening 20. An annular groove 22A is formed in each of the end portions of the leader pin 22 which project out further than the transverse direction end portions of the magnetic tape T. Due to the annular grooves 22A being anchored by hooks or the like of the pull-out means, the hooks or the like do not contact and scratch the magnetic tape T at the time of pulling-out the magnetic tape T.

Figure 3:
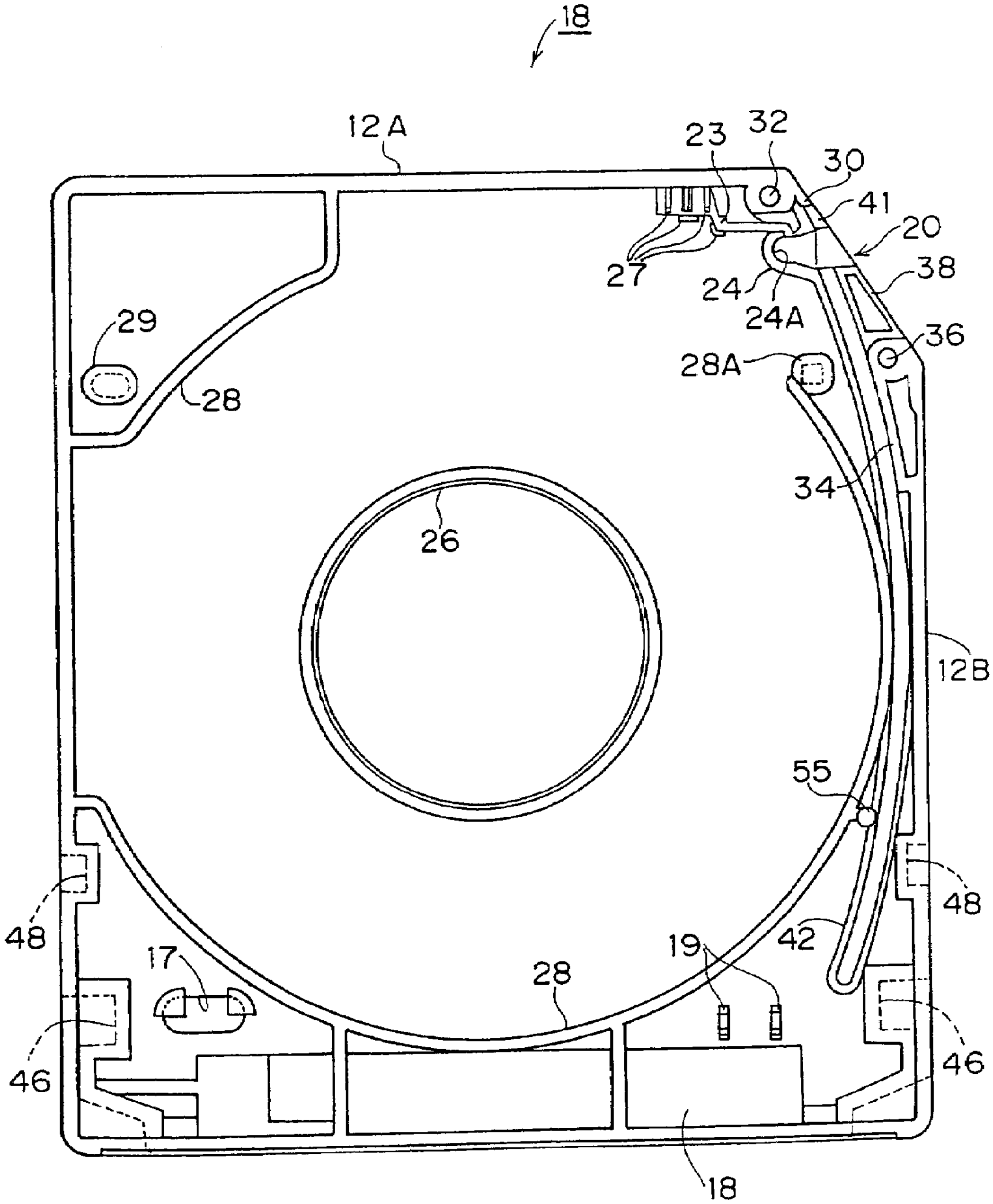
FIG. 3 is a schematic plan view of an lower case.
Figure 4:
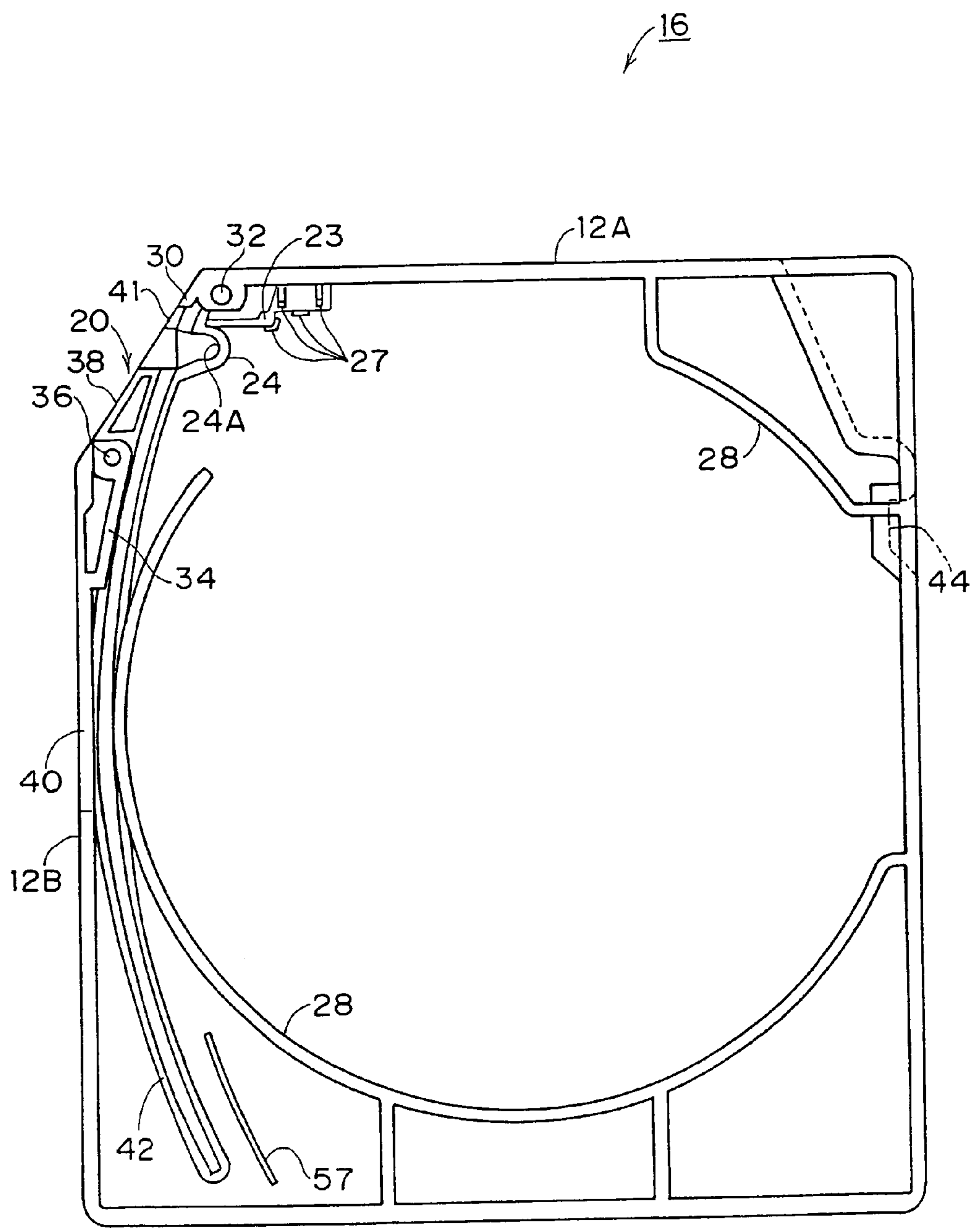
FIG. 4 is a schematic plan view of an upper case.

Next, pin holding portions 24 and plate spring 25 will be described. The pair of upper and lower pin holding portions 24, which position and hold the leader pin 22 at the interior of the case 12, are provided at the inner side of the opening 20 of the case 12. As shown in FIGS. 3 and 4, the pin holding portions 24 are formed in substantially semicylindrical shapes as seen in plan view, such that that magnetic tape T pull-out sides thereof are open. The end portions of the leader pin 22 which is in a state of standing upright can enter into and exit from the pin holding portions 24 from the open sides thereof.

In vicinities of the pin holding portions 24, a proximal portion 25A of the plate spring 25 is inserted and fixed in spring holding portions 27 which are provided at the inner surface of the front wall 12A. The front wall 12A is the portions of the peripheral walls 16A, 18A where the outer surfaces face in the direction of arrow A. The distal ends (free ends) of the plate spring 25, which have been divided so as to be forked in two, push the upper and lower ends of the leader pin 22 toward the inner sides of the pin holding portions 24, and thereby hold the leader pin 22 within the pin holding portions 24. When the leader pin 22 enters into and exits from the pin holding portions 24, the operation portion 25C of the plate spring 25 elastically deforms appropriately so as to permit movement of the leader pin 22.

A gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by movement restricting walls 28 which project out at portions of the inner surfaces of the upper case 16 and the lower case 18, and which serve as inner walls which are on a circular locus which is coaxial with the gear opening 26.

An enclosure 28A, in which a hole for position regulation is formed, is provided so as to be continuous with the end portion of the movement restricting wall 28 in a vicinity of the opening 20. Further, an enclosure 29, in which is formed a hole for position regulation which is a long hole, is provided apart from the movement restricting wall 28 at the inner side of the front left corner portion of the case 12. The enclosures 28A, 29 are disposed on a single straight line which extends along the direction of arrow B. The end portions of the movement restricting walls 28, except for the end portions thereof at which the enclosures 28A are continuous, are continuous with the peripheral wall 16A or the peripheral wall 18A of the case 12, so as to partition the outer sides of the movement restricting walls 28 and the space at which the reel 14 is set.

A memory board M, which stores various types of information, is set at the rear right portion of the lower case 18 for each recording tape cartridge 10. A rear inner wall 18B is formed at an inclined surface of a predetermined angle and the memory board M is disposed so as to be inclined at a predetermined angle, such that sensing is possible at a drive device which reads from the bottom surface side and at a library device (a device which accommodates a plurality of the recording tape cartridges 10 and which automatically loads and removes the recording tape cartridges 10 from drive devices) which reads from the rear wall side.

An unillustrated write protect tab projects from an opening 17, which is provided at the left rear portion of the lower case 18. The write protect tab is set so that recording onto the recording tape cartridge 10 is possible or is not possible.

In addition, a pair of short upper and lower sloped wall portions 30 are provided in a right end portion of a front wall 12A of the accommodating case 12. The sloped wall portions 30 define a front peripheral portion of the opening 20. The sloped wall portions 30 are each formed bent along the opening face of the opening 20 to be thicker than the front wall 12A. A concave portion 30A with which the end of a door 50 (described below) engages is provided in a central portion of the sloped wall portion 30 in the thickness direction thereof. A pair of upper and lower screw bosses 32 is integrally formed inside the front wall 12A in the vicinity on the left side of the sloped wall portion 30.

A pair of upper and lower sloped wall portions 34 are provided inside a front end portion of right wall 12B (portion of the peripheral walls 16A and 18A in the direction of the arrow B) of the accommodating case 12. Each of the sloped wall portions 34 is shaped substantially along an outer peripheral surface of the door 50 (described below) in plan view. Front end portions of the sloped wall portions 34 define a rear peripheral portion of the opening 20. A pair of upper and lower screw bosses 36 are provided in front end portions of the sloped wall portions 34. The inner surfaces of the sloped wall portions 34 function to prevent play of the door 50 during slidable movement thereof.

At the right wall 12B of the accommodating case 12, a slit 40 with a certain length is provided to be used as a window for communication between the inside and the outside of the accommodating case 12. The slit 40 is used to expose an operation protrusion 52 of the door 50. The slit 40 is formed by cutting off a front lower portion of the peripheral wall 16A of the upper case 16 constituting the right wall 12B, and is thereby formed open also toward the opening 20. Thus, the outer surface of the screw boss 36 in the upper case 16 is exposed through the slit 40 (refer to FIG. 1).

The slit 40 described above may be formed such that an upper end thereof is defined only by a top plate of the accommodating case 12 (top plate of the upper case 16). The peripheral wall 16A may be partly remained to maintain the stiffness of the accommodating case 12, such as strength against an impact caused by dropping the case. In this case, the upper wall defining the slit 40 may be provided integral with the sloped wall portion 34.

A concave portion 48 (cut-off portion of the bottom plate) is formed further rearwardly from the concave portion 44 in the lower case 18 (refer to FIG. 4). The concave portion 48 is formed such that a portion excluding an upper end of the peripheral wall 18A is concave similarly to the form of the letter "U" inwardly of the accommodating case 12 and, in addition, is concave upwardly from the lower surface of the accommodating case 12. The concave portion 48 is formed on the left wall of the accommodating case 12. This concave portion 48 is used, for example, as an engagement portion with which a pull-in means of the drive device is engaged. In addition, for example, a bottom surface (downward surface) of the concave portion 48 is used as a reference surface for performing positioning in the drive device.

Further, a concave portion 46 (cut-off portion of the bottom plate) is formed on a rear portion of the concave portion 48. The concave portion 46 is formed such that a portion excluding an upper end of the peripheral wall 18A is concave substantially in the form of the letter "U" inwardly of the accommodating case 12 and, in addition, is concave upwardly from the lower surface of the accommodating case 12. The concave portion 46 is used as an engagement portion with which a holding means of the library device is engaged. A concave portion 44 is formed on an upper portion of a left wall of the upper case 16. The concave portion 44 is used as an engagement portion with which an unillustrated holding member is engaged for canceling the rotational moment caused when the door 50 opens the opening 20.

In each of the upper and lower cases 16 and 18, a guide wall 42 with a certain height (for example, approximately in a range from 1.0 mm to 1.5 mm) is provided. The guide wall 42 extends from the vicinity of the opening 20 to the vicinity of a position at which the movement restricting walls 28 is proximate to the accommodating case 12 (the position hereinbelow will be referred to as the "first half"). The guide wall 42 extends to the vicinity of the rear wall either from the concave portion 44, which defines the rear end of the slit 40, or from the concave portion 44 (the position hereinbelow will referred to as the "second half"). The guide wall 42 described above supports a convex portion 51 of the door 50 (described below) in such a manner as to sandwich it from two sides of an inner surface and an outer surface thereof.

The guide walls 42 are formed substantially arc-shaped in plan view. The guide walls 42 in the upper and lower cases 16 and 18 are formed mutually different in length. Specifically, the second half of the guide wall 42 in the upper case 16 is formed longer than that in the lower case 18. This is because the memory board M is provided to be inclined at a certain angle at the right wall 12B of the lower case 18.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. The front end portions of the guide wall portions 42 extend to positions which, when the leader pin 22 is entering and exiting, do not impede the entry or exit of the leader pin 22. Such positions are about half of the opening width and which are further rearward than pin holding portions 24 in this embodiment. The convex portions 51 which are furthest toward the front at both the top and bottom of the door 50 are restricted such that the door 50 is closed and cannot move any further forward.

In the vicinity of the inclined wall portions 30 as well, guide wall portions 41, whose rear end portions are open, stand erect so as to be positioned on imaginary lines extending from the guide wall portions 42. The rear end portions of the guide wall portions 41 do not extend further rearward than the front ends of the pin holding portions 24, so as to not impede entry and exit of the leader pin 22. The interval (groove width) of the guide wall portion 41 is slightly narrower than the interval (groove width) of the guide wall portion 42.

Namely, the interval (groove width) of the guide wall portion 42 is formed to be slightly wider in order to permit dispersion in molding of the door 50 (dispersion in the curvature of the door 50). The convex portions 51 of the door 50 slide within the guide wall portions 42 in a state in which the convex portions 51 joggle to a certain extent. Accordingly, the interval (groove width) of the guide wall portion 41 is made to be substantially the same size as the width of the convex portion 51 of the door 50 (the width including projections which will be described later). When the opening 20 is closed, due to the front most convex portions 51 entering in the guide wall portions 41, the door 50 can be held without joggling.

The first half of the guide wall 42 is formed somewhat lower than the second half of the guide wall 42. The first half of the guide wall 42 is formed to a height of around 1 mm, whereas the second half of the guide wall 42 is formed to a height of around 1.5 mm. The guide wall 42 is thus formed to secure spacing of the opening 20 to be sufficient to allow entrance of the pull-out means of the drive device that chucks the leader pin 22 to pull it out. For this reason, as described below, the door 50 in the first-half portion (at least a portion for blocking the opening 20) has a plate width (height) larger (higher) than the smaller height of the guide wall 42.

On an inner surface of each of the upper and lower cases 16 and 18, a rib 38 is formed integral with the outer guide wall 42 exposed to the outside through the opening 20 to have a substantially trapezoidal shape in plan view. The rib 38 is formed to a height equal to the height of the aforementioned guide wall 42. The rib 38 works to secure the strength of each of the upper and lower cases 16 and 18 in the portion of the opening 20. The inner guide wall 42 is integrally formed with the pin holder 24. The pin holder 24 may be formed to a height substantially equal to or higher than the height of the integrally formed guide wall 42.

As described above, the upper case 16 and the lower case 18 are fixed (coupled) with unillustrated screws inserted from the underside into the screw bosses 32 and 36 positioned in the vicinity of the opening 20. The corner portions at two ends of the opening 20 are insufficient in strength and tend to collide with the ground in an event the accommodating case 12 is dropped. In the structure described above, the corner portions are defined by individual free ends of the sloped wall portion 30 (front wall 12A) and the sloped wall portions 34 (right wall 12B) and are strongly coupled. Thus, even when dropped, the accommodating case 12 is neither deformed nor buckled due to the weight of the overall recording tape cartridge 10. A portion where the peripheral walls 16A and 16B are joined at both corners of the opening 20 may be welded for fixing. For taking parts apart and recycling, the portion may be screwed for fixing.

The opening 20 is opened and closed by the door 50 which serves as a closing member. The plate width (height) of at least the portion of the door 50 for closing the opening 20 is substantially the same as the opening height of the opening 20 as shown in FIG. 2. The plate length of this portion is formed to be sufficiently larger than the opening width of the opening 20. Further, the door 50 is formed in a substantial arc-shape in plan view which is curved in the direction of the plate thickness, so that the door 50 can move along a predetermined circumference.

Figure 7A:
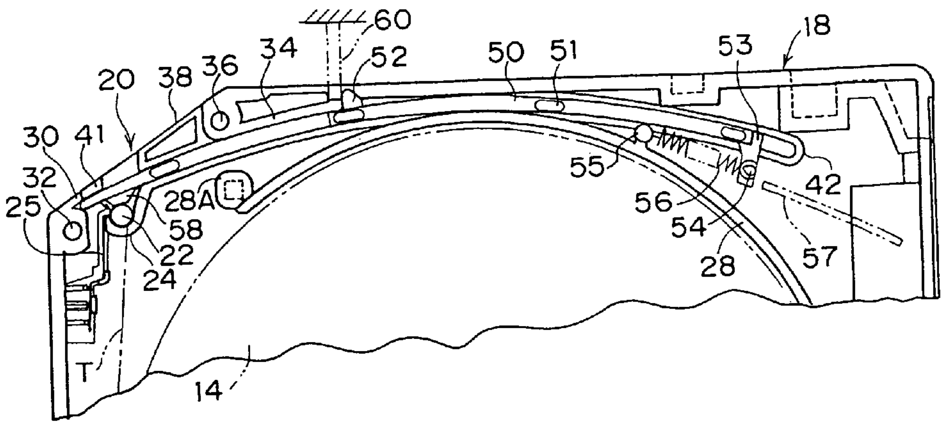
FIGS. 7A through 7C are schematic explanatory diagrams showing processes of the door opening an opening.
Figure 7B:
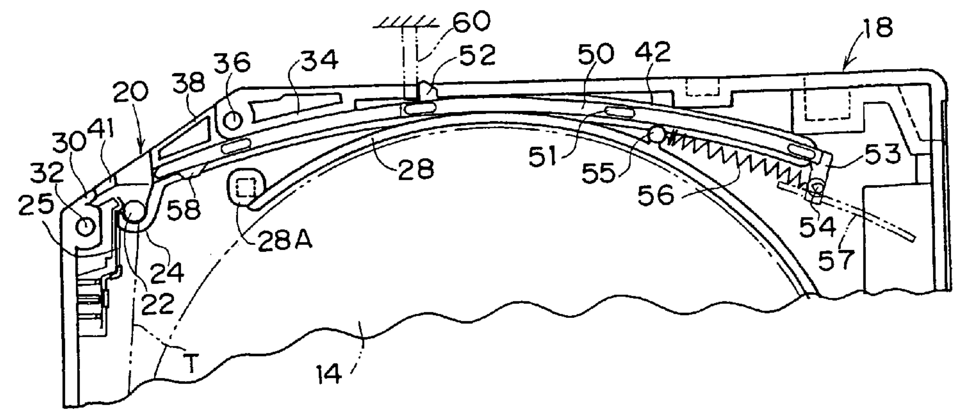
Figure 7C:
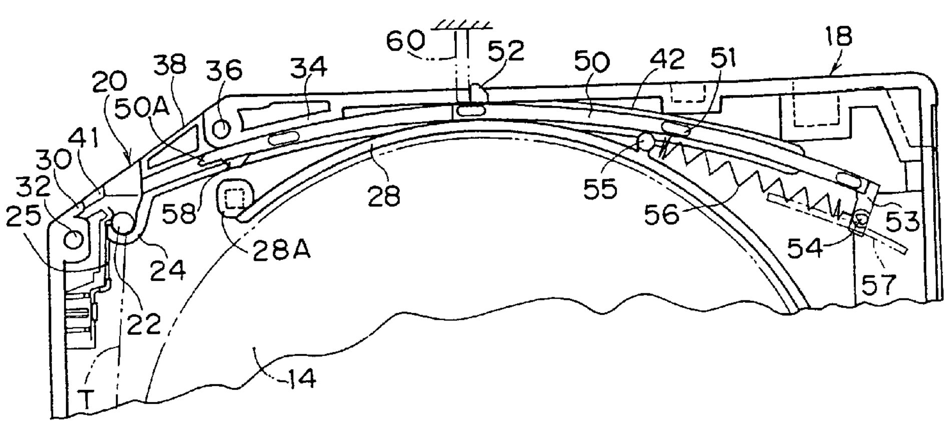
Figure 8:
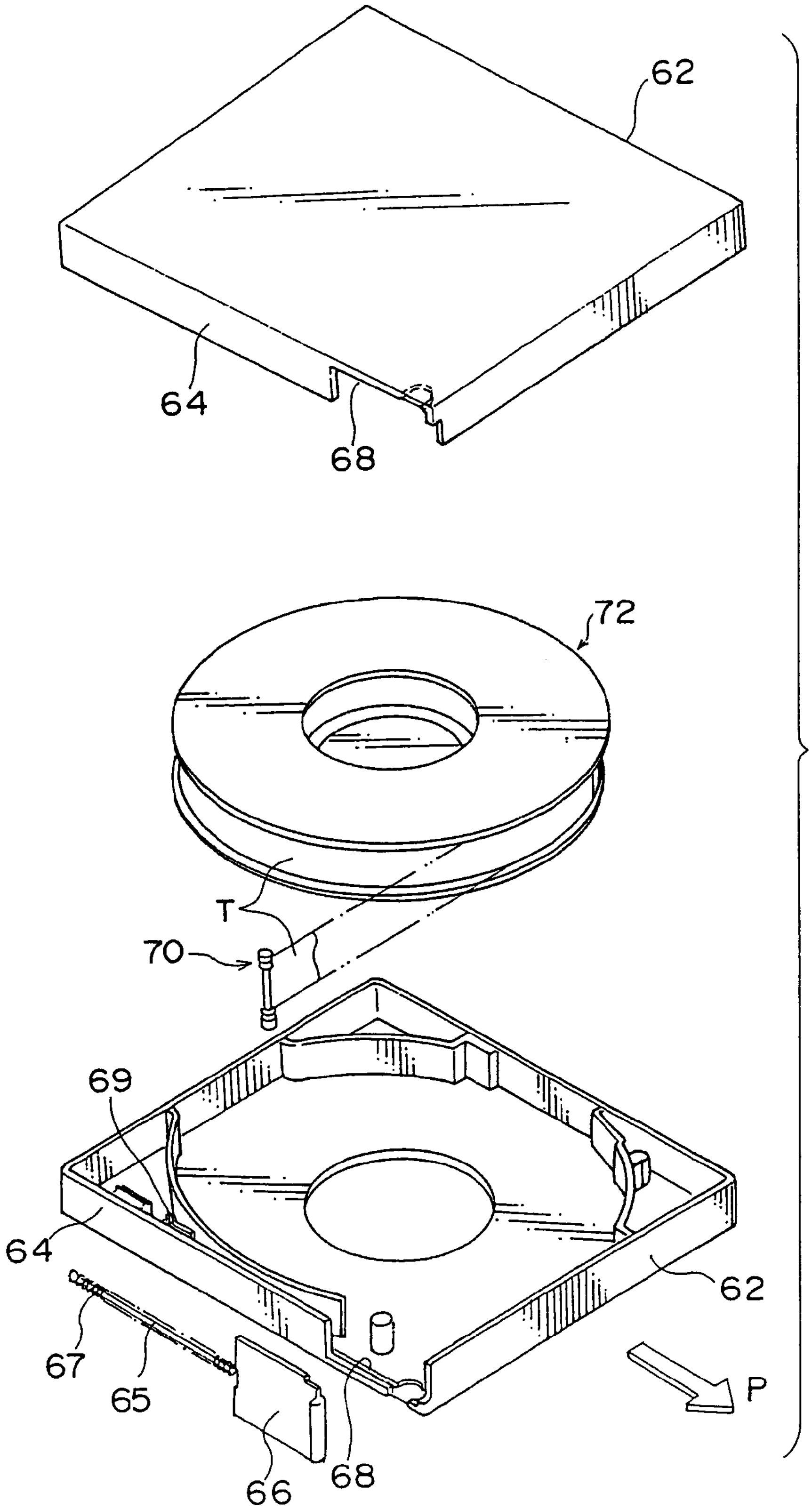
FIG. 8 is a schematic exploded perspective view of a conventional magnetic tape cartridge equipped with a leader pin.

The door 50 closes the opening 20 in a state in which the distal end portion of the door 50 has entered into the concave portions 30A of the inclined wall portions 30 (FIG. 7A). When the door 50 slides (rotates) substantially rearwardly along the aforementioned predetermined circumference so as to open the opening 20 (FIG. 7B), and the outer peripheral surface in the vicinity of the distal end of the door 50 reaches a vicinity of the screw bosses 36, the opening 20 is completely opened (FIG. 7C). Further, the door 50 closes the opening 20 by sliding (rotating) in the direction opposite to the direction at the time of opening the opening 20.

As described above, the door 50 is arc-shaped corresponding to the circumference predetermined as a movement locus thereof. In the present embodiment, a center of the rotational movement (pivot center) is determined such that the position in the left-right direction is set to the vicinity of the left end of the accommodating case 12, and the position in the front-rear direction is set to the vicinity of the rear end of the slit 40. Thereby, the movement locus of the door 50 becomes proximate to the right wall 12B of the accommodating case 12 in the vicinity of the slit 40. The rotation center and radius of the door 50 may appropriately be determined according to, for example, the positions of front and rear end portions (such as the sloped wall portion 30 and the screw boss 36) of the opening 20 and the opening-face angle of the opening 20. The positions of the front and rear end portions are determined according to requirements of the drive device, and the opening-face angle is determined according to requirements of the library device.

The plate length of the door 50 or the curved longitudinal dimension thereof is determined such that, in the state in which the door 50 closes the opening 20, the rear end portion of the driving portion 50B is positioned in the right rear corner portion of the case 12. Note that the bottom rear portion of the driving portion 50B is cut obliquely in order to avoid the memory board M which is disposed obliquely at the rear wall 18C.

A plurality of convex portions 51, which enter into the upper and lower guide grooves 42, project at the upper and lower ends of the door 50. The convex portions 51 abut guide surfaces (mutually opposing inner surfaces) of the guide walls 42 and an inner surface of the upper case 16 and an inner surface of the lower case 18 between the guide walls 42 to thereby guide the door 50 along the opening/closing direction. The convex portions 51 are each formed substantially elliptical (in plan view) along the lengthwise direction of the door 50, and four pieces thereof protrude on each of the upper and lower surfaces of the door 50 to be vertically symmetric except for the rearmost the convex portions 51. For example, the convex portions 51 in front of a border of two different widths of the door 50 are about 0.5 mm, and the rest of the convex portions 51 behind the border are about 1.5 mm. The rearmost convex portions 51 are provided asymmetric for the reason that the rear-lower portion of the door 50 is diagonally cut off.

The convex portion 51 is formed such that each of the upper surface and the lower surface thereof is shaped to include a substantially wide circular arc in cross-sectional view (side view). Further, a protrusion 51A having either a shape including a substantially circular arc in plan view or a substantially triangular shape in plan view is formed on each sidewall of the convex portion 51. Therefore, when the convex portions 51 are inserted between the guide walls 42 and are slidably moved, only the substantially arcuate end of the convex portion 51 contact either the inner surface of the upper case 16 or the inner surface of the lower case 18 in the manner of linear contact. Concurrently, only the tip of the protrusion 51A, which has the substantially arcuate shape or the like, contacts each of the mutually opposing guide surfaces of the guide walls 42 also in the manner of line contact.

The above arrangement enables reduction in the sliding resistance (friction) among the individual upper and lower convex portions 51, the individual inner surfaces of the upper and lower cases 16 and 18, and the individual guide surfaces of the guide walls 42. Consequently, the door 50 can be caused to slide smoothly. The convex portion 51 provided as a friction-reducing device, as described above, is not limited to that shown in the individual drawings, and arbitrary means may be employed as long as the means performs either linear contact or point contact but not to perform surface contact. For example, a substantially semispherical protrusions or the like may be formed on two sides of the convex portion 51. Meanwhile, the convex portion 51 formed substantially elliptical in plan view is superior in impact resistance to a convex portion 51 formed substantially circular in plan view. Hence, even when a force is imposed on the door 50 from a direction other than the opening/closing direction, the convex portion 51 will not be broken thereby.

As an operation portion, the operation protrusion 52 is formed along the radial direction of the door 50 on the outer peripheral surface in a portion located slightly forward from a longitudinal central portion of the door 50 in the vicinity of the boundary portion where the plate width of the door 50 is different. The operation protrusion 52 is exposed to the outside of the accommodating case 12 through the slit 40. In the closed state of the opening 20, the operation protrusion 52 is positioned in a portion slightly spaced away from the rear end of the screw boss 36, and can be operated through a portion opened forward in the slit 40. In the opened state of the opening 20, the operation protrusion 52 is positioned in a portion slightly spaced away from the rear end of the slit 40. The rearmost convex portion 51 abuts the rear end portion of the guide wall 42.

The inside and outside of the accommodating case 12 are communicated through the slit 40 provided for exposing the operation protrusion 52. In this connection, the slit 40 is substantially closed by the screw boss 36 at all times, the door 50 extending to substantially the overall height of the accommodating case 12, and the concave portion 44 formed to guide the door 50. Concurrently, the movement restricting walls 28 prevent adhesion of dust and the like to the magnetic tape T wound around the reel 14.

Figure 6:
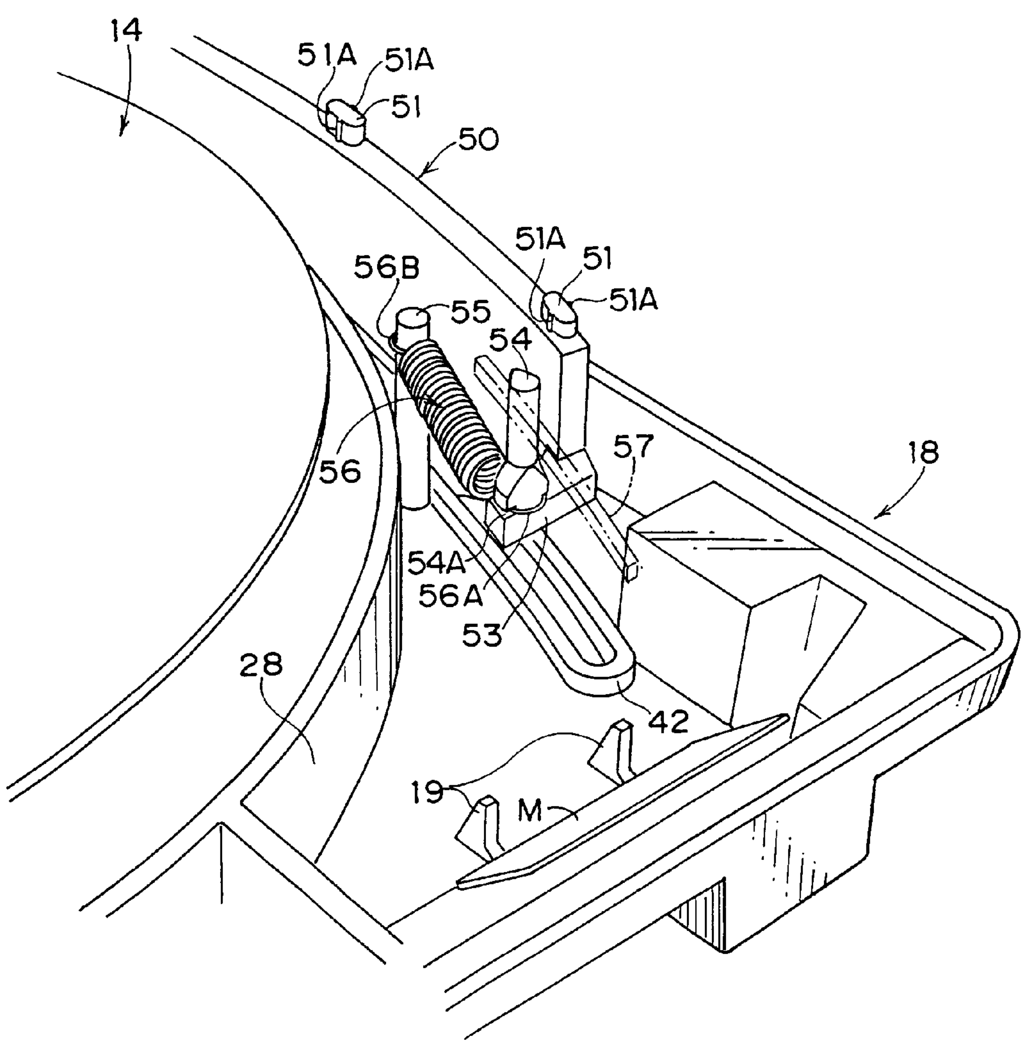
FIG. 6 is a schematic perspective view showing the state at a rear portion side of the door which has been assembled into a case.

The coil spring 56, which serves as an urging member which urges the door 50 in the direction of closing the opening 20, is of a length such that it extends to the rear right corner portion of the case 12 in the state in which the door 50 closes the opening 20. Thus, as shown in FIG. 6, the space between the movement restricting wall 28 and the right wall 12B (the peripheral walls 16A, 18A) at this rear right corner portion can be utilized effectively. Substantially ring-shaped attachment portions 56A, 56B, whose end portions are cut, are formed at the both ends of the coil spring 56. The coil spring 56 is attached by the attachment portions 56A, 56B being placed from above on a holding projection 54 and an anchor projection 55, which serve as portions of attachment and which will be described later, such that the holding projection 54 and the anchor projection 55 are inserted through the attachment portions 56A, 56B.

Figure 5:
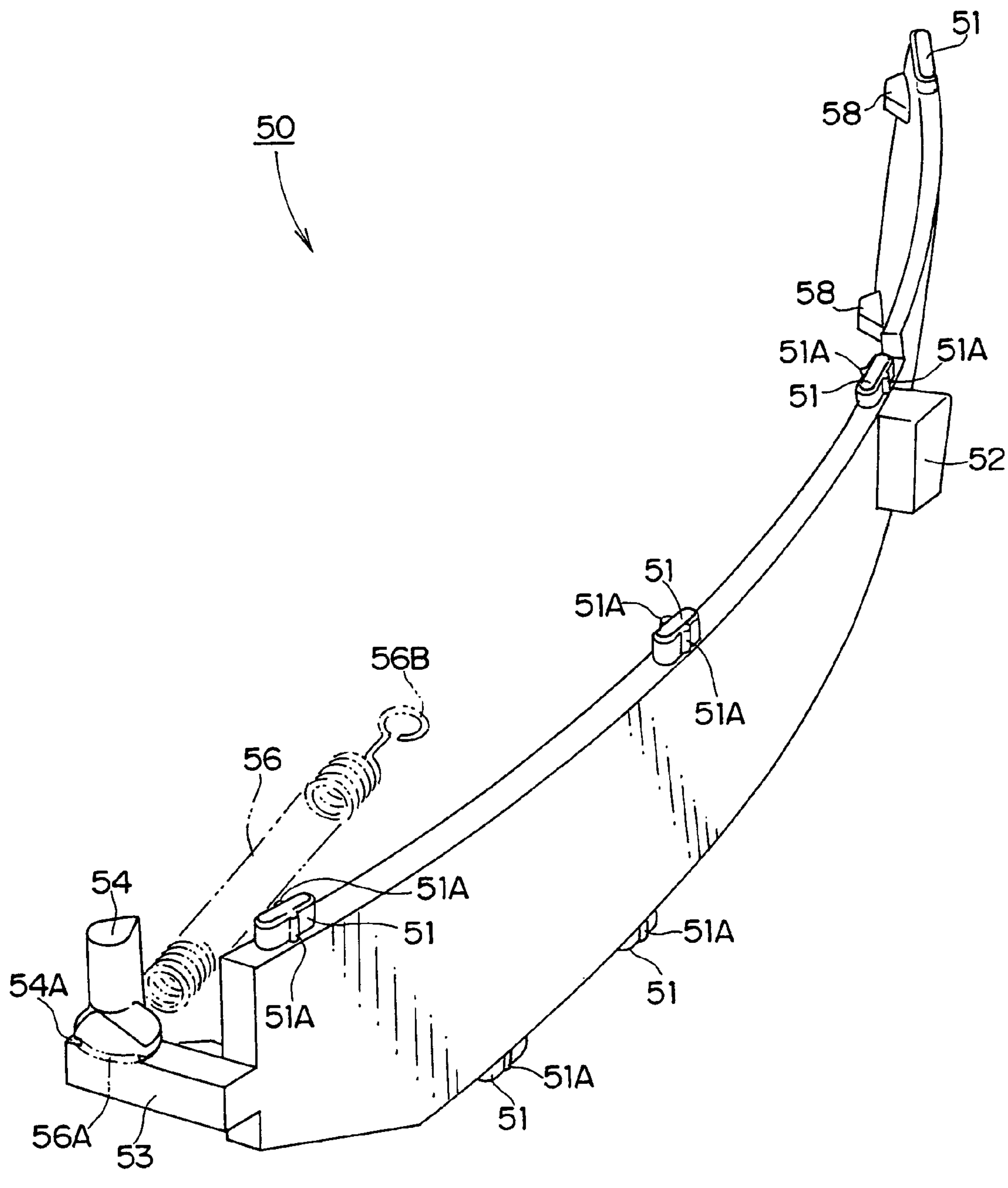
FIG. 5 is a schematic perspective view of a door.

Namely, as shown in FIGS. 5 and 6, a supporting plate 53 projects integrally from the inner peripheral surface of a vicinity of the rear end of the door 50. The holding projection 54, which is approximately a cylindrical solid, projects integrally and upwardly from the top surface of the supporting plate 53, such that a spring holding portion, which is substantially L-shaped in rear view, is formed. The proximal end side (supporting plate 53 side) of the holding projection 54 extends out in a substantially truncated cone shape, and an annular concave portion 54A is formed at the side surface (peripheral surface) of the bottommost end thereof (above the supporting plate 53).

Accordingly, the substantially ring-shaped attachment portion 56A, which is fit onto the holding projection 54 from above, widens due to metal elasticity while being guided appropriately by the side surface (peripheral surface) of the proximal portion which swells out in a substantially truncated cone shape. Due to the attachment portion 56A being fit into the annular concave portion 54A, the attachment portion 56A is restored slightly, and is anchored in the annular concave portion 54A. In this way, as shown by the imaginary lines in FIG. 5, the coil spring 56 is supported in a cantilevered manner such that the attachment portion 56B side thereof does not droop down due to its own weight (the attachment portion 56B side is substantially perpendicular to holding projection 54).

The anchor projection 55, which is a substantially cylindrical solid, projects upwardly at the inner surface of the lower case 18 in a vicinity of the concave portion 48. The substantially ring-shaped attachment portion 56B is fit on the anchor projection 55, and the coil spring 56 is disposed within the aforementioned space. Namely, the coil spring 56 is, together with the door 50, assembled into the case 12 in a state in which the one attachment portion 56A has been fit with and anchored in the annular concave portion 54A such that the coil spring 56 is supported by the holding projection 54 in a cantilevered state (i.e., supported such that the other side thereof does not droop down). Thereafter, the coil spring 56 is attached within the case 12 due to the other attachment portion 56B being fit on the anchor projection 55.

Accordingly, the coil spring 56 can be assembled in the case 12 simply, and the ability to assemble the door 50 and the coil spring 56 into the case 12 (ease of assembly) can be improved. Note that it is preferable that the anchor projection 55 also projects upwardly. In this way, it is easy to fit the attachment portion 56B onto the anchor projection 55. Moreover, when the coil spring 56 is to be removed, it suffices for the attachment portion 56B to be pulled-up upwardly and taken off of the anchor projection 55, and the coil spring 56 to be removed together with the door 50. Thus, the removal operation is also simplified.

In accordance with this structure, even if impact due to a drop or the like is applied to the case 12, the attachment portion 56A of the coil spring 56 is fit with and anchored in the annular concave portion 54A. Therefore, the attachment portion 56A does not come off of the holding projection 54. With regard to the attachment portion 56B as well, because the top end of the anchor projection 55 is inserted between the movement restricting wall 28 and the guide wall portion 42 of the upper case 16, the attachment portion 56B similarly does not come off of the anchor projection 55. Note that the cantilever supporting means formed at the holding projection 54 is not limited to the illustrated structure. Any structure suffices provided that the other end (attachment portion 56B) side of the coil spring 56 can be supported so as to not bend downwardly due to its own weight.

A rib 57, along which the top portion of the holding projection 54 slides at the time the door 50 is being opened and closed, stands erect in a substantial arc-shape in plan view at the upper case 16. The rib 57 is disposed at a position and has a length such that the distal end (top end) of the holding projection 54 can slide within the rib 57 at least when the door 50 starts to move (open). Due to the rib 57 suitably guiding the holding projection 54 which moves against the urging force of the coil spring 56, the door 50 can be opened more stably (the door 50 does not shake due to the urging force of the coil spring 56 at the time of opening).

Stoppers 58, which abut the upper end portion side surface and the lower end portion side surface of the leader pin 22 when the opening 20 is closed, project at the inner surface of the front end portion of the door 50. The stoppers 58 can even more reliably prevent the leader pin 22 from falling out from the pin holding portions 24 due to impact if the recording tape cartridge 10 is dropped or the like. Moreover, there are cases in which the inner surface and/or the outer surface at the front end portion of the door 50 which enters into the guide wall portions 41 may be formed as a tapered surface so as to smoothly enter into the guide wall portions 41. At the door 50 shown in FIG. 7, a tapered surface 50A is formed at the outer surface side thereof.

Now, operation of the present embodiment will be described. When not in use (for example, in a stocked time and a transportation time), the opening 20 is kept closed by the door 50. The opening 20 is closed by the door 50 such that the end portion (front end portion) of the door 50 is engaged into the concave portion 30A of the sloped wall portion 30 according to an urging force of the coiled spring 56. Then, an outer peripheral surface of a central portion substantially contacts the inner surface of the sloped wall portion 34, and thereby closes the opening 20.

When using the magnetic tape T, the recording tape cartridge 10 is inserted into the drive device along the direction of the arrow A. Following the insertion, an engagement protrusion 60 enters the slit 40 opened forward and then engages the operation protrusion 52 of the door 50, as shown in FIG. 7A. The engagement protrusion 60 is an opening/closing member that constitutes opening/closing means of the drive device. In this state, when the recording tape cartridge 10 (accommodating case 12) is pushed into the drive device, while opposing the urging force of the coiled spring 56, the engagement protrusion 60 backwardly moves the operation protrusion 52 according to a push-in force forces. The operation protrusion 52 is moved backward in relation to the accommodating case 12.

Subsequently, the door 50, on which the operation protrusion 52 is formed, is operated such that the convex portions 51 are guided by the guide walls 42 along the curve of the guide walls 42 in clockwise in plan view. Thus, the door 50 is guided by the guide wall 42 to move substantially rearwardly in such a manner as to rotate around the pin holder 24 and the reel 14, without moving out of the movement locus present along the U-curved shape of the guide walls 42. Upon insertion of the accommodating case 12 (recording tape cartridge 10) into the drive device to a predetermined depth, the opening 20 is fully opened, as shown in FIG. 7C.

At this time, the holding projection 54, to which one end of the coil spring 56 is attached, is suitably guided by the rib 57. Thus, the coil spring 56 suitably extends between the guide wall portion 42 and the rib 57 as seen in plan view. Accordingly, trembling (shaking) of the coil spring 56 itself is suppressed, and the door 50 can move stably (without shaking) even when moving against the urging force of the coil spring 56. Thus, the opening 20 can always be opened in a stable state.

In the state described above, after the recording tape cartridge 10 has been positioned in the drive device, the door 50 is regulated not to further pivot (movement substantially to the rearward). Subsequently, the pull-out means of the drive device moves into the accommodating case 12. Thereby, the pull-out means pulls out the leader pin 22 positioned and held on the pin holder 24 and transfers it to be set to an unillustrated take-up reel. The take-up reel and the reel 14 are then rotationally driven in synchronization. Thereby, the magnetic tape T is taken up on the take-up reel and is sequentially transferred out from the accommodating case 12. During the transfer operation, information is read (played back) or written (recorded) by, for example, a read/write head disposed along a predetermined tape path.

When ejecting the recording tape cartridge 10 from the drive device after the magnetic tape T has been wound back on the reel 14, the positioned state is relieved. Then, the recording tape cartridge 10 moved to the opposite direction of the direction of the arrow A according to either the urging force of the coiled spring 56 or an unillustrated injection mechanism. The door 50 is guided through the convex portions 51 along the guide walls 42. Concurrently, the door 50 is rotationally moved in the closing direction of the opening 20 according to the urging force of the coiled spring 56. When the end portion of the door 50 has entered into the guide wall 41, the opening 20 is fully closed, thereby returning to the initial state.

Because the opening 20 is formed by cutting off an insertion-side corner portion of the rectangular accommodating case 12, the opening face thereof faces the direction of the arrow A and the direction of the arrow B. The opening face is inclined with respect to the direction of the arrow A. Specifically, the pull-out means of the drive device can access the leader pin 22 from the front face side facing the direction of the arrow A. Hence, the pull-out means does not need to access the leader pin 22 from a portion (side of the arrow B) further outward than the peripheral walls (sidewalls) 16A and 18A on the side of the arrow B. Thus, a path for pulling out the magnetic tape T can be set shortest in the drive device. In addition, the above obviates the needs of providing a drive mechanism in which pull-out means accesses the leader pin from the side of the arrow B of the accommodating case 12 via a roundabout route. This enables miniaturization and cost reduction to be implemented.

The arcuate formed door 50 rotationally moves such as to rotate around the reel 14 and the pin holder 24 (leader pin 22) without moving out of the movement locus along the shape of the door 50, and thereby opens or closes the opening 20. Accordingly, the door 50 does not move out of the outer frame of the case 12 when opening or closing the opening 20. As a result, the accommodating space in the drive device for the recording tape cartridge 10 can be reduced. Thereby, the drive device can be miniaturized, and spacing in the drive device can be effectively used. In addition, the movement locus of the door 50 does not interfere with the pin holder 24 (leader pin 22) or the reel 14 in the case 12. Concurrently, the door 50 can be formed to save space for its movement. Hence, spacing in the case 12 can be effectively used.

It is sufficient that the opening/closing member 60 of the drive is fixed for entering the slit 40 and engaging the operation protrusion 52 of the door 50. Thus, the relevant structures can be simple. Because the door 50 opens or closes the opening 20 by the urging force of the coiled spring 56, the drive does not need a mechanism for driving the door 50 to the closing direction of the opening 20. This leads to simplifying the structure of the opening/closing means including opening/closing member 60 of the drive.

The rotational center of the door 50 for opening and closing the opening 20 whose opening plane inclines with respect to the direction of arrow A can be determined independently of the axially central position of the reel 14. Thus, the angle of inclination of the opening plane of the opening 20 with respect to the direction of arrow A, the size of the opening 20 can be freely set. The size of the door 50 for opening and closing the opening 20 is free as far as the door 50 satisfies the requirements of the drive. The degree of freedom in designing the opening 20 (the recording tape cartridge 10) increases because of the curved or arcuate locus of movement of the door 50.

Further, when the path for pulling-out the magnetic tape T is made to be the shortest as described above, the path of the magnetic tape T also is short as a matter of course. Thus, the contact wear of the magnetic tape T and a tape guide (e.g., a roller which is rotatably supported) can be decreased. Moreover, the opening 20 is formed by cutting off a corner portion of the case 12, and is directed in the direction of arrow A and the direction of arrow B. The range of directions over which the pull-out means (the hooks or the like) can access the leader pin 22 is broad. Thus, the range of positions at which the leader pin 22 can be set within the case 12 is broad. Thus, the degree of freedom in designing the drive device increases.

The door 50 is a separate member from the leader pin 22 which is pulled out from the case 12. Thus, in the assembled state, the door 50 cannot be removed from the case 12. Namely, the door 50 does not come out from the case 12 due to impact or the like when the recording tape cartridge 10 is dropped. When the magnetic tape T is not being used, the leader pin 22 is accommodated within the case 12 which is in a tightly closed state in which the opening 20 is closed by the door 50. It is therefore difficult for the leader pin 22 to become scratched or dirtied. Thus, the pulling-out and the conveying of the magnetic tape T within a drive device are not affected, and the magnetic tape T itself is not damaged.

The door 50 opens and closes the opening 20 by the convex portions 51, which are substantially oval in plan view, sliding while being supported between the guide wall portions 42 which are provided parallel at the inner surfaces of the case 12. Thus, there is no need to form grooves or the like in the inner surfaces of the case 12. Accordingly, the rigidity of the case 12 is not adversely affected. Moreover, the coil spring 56 is assembled into the case 12 together with the door 50 in a state in which one end of the coil spring 56 is supported in a cantilevered manner at the holding projection 54 (a state of being supported such that the other end side does not droop down). Thereafter, the other end is attached to the anchor projection 55. Therefore, assembly is easy as compared with the conventional art. Accordingly, the ability to assemble the door 50 and the coil spring 56 into the case 12 can be improved.

Further, because the rib 57, which the holding projection 54 slidingly contacts at the time when the door 50 is opened and closed, is provided in the upper case 16, the coil spring 56 can extend and contract in a state in which trembling (shaking) thereof is suppressed. Accordingly, when the door 50 moves in the direction of opening the opening 20 against the urging force of the coil spring 56, the door 50 can be guided more stably than if it were guided only by the guide wall portions 42.

As described above, in accordance with the present invention, the ability to assemble a shielding member and an urging member into a case can be improved.

What is claimed is:

1. A recording tape cartridge comprising:

a case which is substantially rectangular and which rotatably accommodates a single reel on which a recording tape is wound;

a portion having an opening which is formed in the case and is for pulling-out of a leader member attached to an end portion of the recording tape;

a shielding member opening and closing the opening by sliding; and an urging member urging the shielding member in a direction of closing the opening, wherein a cantilevered supporting portion, which supports the urging member, is formed at a portion for attachment of the urging member, which portion for attachment is provided at the shielding member, and wherein the shielding member includes a door which is arc-shaped in plan view and curves along a direction of thickness of the door, and the door includes a supporting plate provided at an inner peripheral surface side of a rear end portion of the door, and the portion for attachment is a holding projection being a cylindrical solid and formed at a top surface of the supporting plate.

2. The recording tape cartridge of claim 1, wherein a supporting plate side of the holding projection is formed in the form of a truncated cone, and the supporting portion includes an annular concave portion formed in a side surface of the truncated cone.

3. The recording tape cartridge of claim 1, wherein the urging member includes a coil spring which urges elastically.

4. The recording tape cartridge of claim 3, wherein a longitudinal dimension of the shielding member is determined such that a rear end portion of the shielding member is positioned at one corner portion of the case in a state in which the opening is closed, and the coil spring is of a length such that, when the coil spring is attached, the coil spring reaches said corner portion of the case in a state in which the shielding member closes the opening.

5. The recording tape cartridge of claim 1, wherein the case includes an upper case and a lower case, and a rib, which an upper portion of the holding projection slidingly contacts when the shielding member is opening and closing, is provided at the upper case in an arc-shape in plan view.

6. The recording tape cartridge of claim 5, wherein the rib is provided at the upper case at a position and of a length such that an upper end of the holding projection slidingly contacts the rib at least when the shielding member starts to move, and the rib can guide the holding projection which moves against urging force of the urging member.

7. The recording tape cartridge of claim 6, wherein the urging member can extend and contract in a state in which shaking of the urging member is suppressed by the rib.

8. A recording tape cartridge comprising:

a case which is substantially rectangular and which rotatably accommodates a single reel on which a recording tape is wound;

a portion having an opening which is formed in the case and is for pulling-out of a leader member attached to an end portion of the recording tape;

a shielding member opening and closing the opening by sliding; and an urging member urging the shielding member in a direction of closing the opening, wherein a cantilevered supporting portion, which supports the urging member, is formed at a portion for attachment of the urging member, which portion for attachment is provided at the shielding member, wherein the case includes an upper case and a lower case, and a solid cylindrical anchor projection is provided at an inner surface of the lower case, and ring-shaped attachment portions are formed at both ends of the urging member, and the attachment portions can be fit on the holding projection and the anchor projection such that the holding projection and the anchor projection are inserted through the attachment portions.

9. The recording tape cartridge of claim 8, wherein when the urging member is to be removed, the attachment portion through which the anchor projection is inserted is taken off of the anchor projection, and the urging member can be removed together with the shielding member.

10. The recording tape cartridge of claim 8, wherein the upper case and the lower case include movement restricting walls which project at inner surfaces of the upper case and the lower case and are arc-shaped and hold the reel, and guide wall portions which project at the inner surfaces of the upper case and the lower case and which support the shielding member so as to sandwich the shielding member, and an upper end of the anchor projection can be inserted between the movement restricting wall and the guide wall portion of the upper case.

11. The recording tape cartridge of claim 8, wherein the urging member includes a coil spring which urges elastically.

12. The recording tape cartridge of claim 11, wherein a longitudinal dimension of the shielding member is determined such that a rear end portion of the shielding member is positioned at one corner portion of the case in a state in which the opening is closed, and the coil spring is of a length such that, when the coil spring is attached, the coil spring reaches said corner portion of the case in a state in which the shielding member closes the opening.

* * * * *